J. F. Keeler,

Petroleum Car.

No. 2,031. Reissued July 18, 1865.

Witnesses
Samuel Graham
Frank W. Kennedy

Inventor
J. F. Keeler

UNITED STATES PATENT OFFICE.

JOEL F. KEELER, OF PITTSBURG, PENNSYLVANIA.

IMPROVEMENT IN CONSTRUCTING RAILROAD-CARS FOR TRANSPORTING OIL AND OTHER LIQUIDS.

Specification forming part of Letters Patent No. 45,834, dated January 10, 1865; Reissue No. 2,031, dated July 18, 1865.

*To all whom it may concern:*

Be it known that I, JOEL F. KEELER, of Pittsburg, in the county of Allegheny and State of Pennsylvania, have invented a new and useful Improvement in the Construction of Railroad Freight-Cars; and I do hereby declare that the following is a full, clear, and exact description thereof, reference being had to the accompanying drawings, forming part of this specification, in which—

Figure 1:
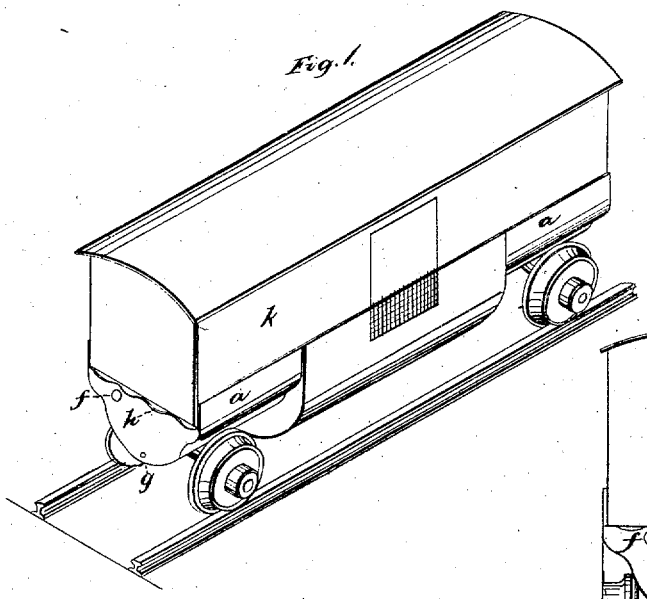
Figure 3:
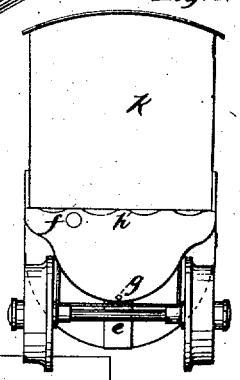
Figure 2:
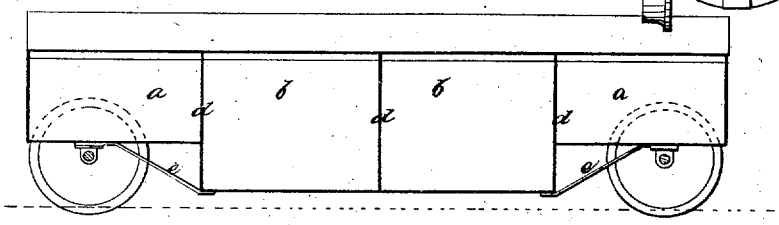
Figure 4:
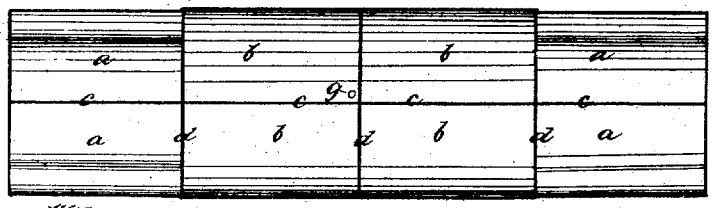

Figure 1 is a perspective representation of my improved freight-car. Fig. 2 is a longitudinal vertical section of the lower part or tank. Fig. 3 is an exterior end view or elevation of my improved freight-car. Fig. 4 is a horizontal longitudinal section through the lower part or tank.

In the several figures like letters of reference denote similar parts.

My improvement is designed to adapt railroad "freight-cars" (technically so called) to the carrying of liquid freight in bulk and dry freight of any description in the same car, and that without detracting from the capacity of the car for either kind of freight by the carriage of the other. In the construction of a freight-car for the purposes specified I also attain the following objects, which distinguish my invention from other contrivances for the transportation of liquid freight in bulk, viz: First, I make the tank portion of the car to extend downward below the level of the top of the car-wheels, so as to make use of space otherwise unoccupied, and render the car more steady by materially lowering its center of gravity when the tank is full, without rendering it top-heavy when the tank is emptied and the upper part loaded; second, I make the tank portion of the car self-supporting by so constructing it as to form itself the truss of the car, which sustains the superincumbent weight of dry freight; third, I so construct the top part or cover of the tank part of the car as to form one or more contracted spaces, each of less horizontal area than the body of the tank, so as to give room for the expansion and contraction of the liquid contents of the tank, and at the same time check the tendency of the liquid contents to surge or move in waves when the car is in motion; fourth, I provide for the passage of air between the cover of the tank and the bottom of the freight-box, for the purpose of keeping the fluid contents of the tank cool and carrying off any gas.

To enable others skilled in the art to construct and use my improved freight-cars, I will proceed to describe my invention more fully.

I construct my freight-cars in any of the known forms and modes, excepting as hereinafter specially described as differing therefrom, and apply to them axles and wheels, or trucks with two or more wheels, as I deem advisable, together with springs, bumpers, brakes, and other ordinary appendages of railroad-cars; but in order to fit them for the transportation of liquids in bulk, without detracting from their adaptation to the carriage of other freight, I prefer to make the lower section of the car, or the "truck-tank," as I call it, of plates of iron, either black or coated with other metal, although I do not desire to confine myself to the use of that material.

In the drawings, *a b* is the truck-tank, the lower part of which I prefer to make of semicircular shape, like the part marked *b*, or of ogee shape, like the parts marked *a*, thereby securing the greatest lateral and perpendicular capacity consistent with the attachment of the trucks or wheels. The parts *a* and *b* are connected together so as to form one tank, and the tank is so constructed relatively to the wheels that its bottom, both in the parts *a* and *b*, extends downward below the top of the wheels. The part *b*, situate in the middle of the car, being out of the reach of the trucks and wheels, is fuller and deeper than the parts marked *a*. Inside of the truck-tank *a b* are cross bulk-heads *d* and longitudinal partitions *e*, which add staunchness to the tank and check the surging of its liquid contents when the car starts or stops. I also add braces *e e*, if needed.

The upper part or cover, *h*, of the truck-tank forms the bottom of the upper part or box of the car for carrying dry freight. This cover *h* I make of sheet-iron, corrugated, as shown in Figs. 1 and 3, the corrugations strengthening the truss and stiffening the floor. These corrugations in the tank-cover serve also to form contracted spaces when the tank is filled with liquid to the level of the lower line of the wave-like corrugations. Each of these spaces is smaller in horizontal area than the body of the tank, and serves the double purpose of giving room for the expansion of the liquid in the car, and serves materially to check the surging of the liquid by the motion or stoppage of the car.

The several compartments formed by the bulk-heads *d* and partitions *e* have holes to permit the fluid contents, when desired, to run together, which holes may be closed, and thus the contents kept separated. The holes at *g g*, with stop-cocks, tubes, &c., permit the contents to be drawn off readily, and other holes, *f f*, near the top of the tank, which are closed in the usual way, allow of the speedy filling or clearing of the tank. The joints of the tank are not only lapped and riveted, but also soldered, and when the iron is thick enough to permit of it the joints may be calked, so that leakage is provided against in every possible way. The tank thus constructed forms the truss or frame which supports the upper part or freight-box of the car, and therefore needs no frame to sustain it on the wheels or trucks, which may be connected with it in any convenient manner. The sides of the truck-tank extend above the cover on either side, as shown at *i i* in Fig. 3. Between these side pieces, *i i*, I lay on the corrugated cover *h* boards, which form the floor of the box *k*, which is placed or framed above the truck-tank, to hold the dry freight. By this means there are longitudinal channels formed under the flooring-boards by the corrugations of the tank-cover, which channels, being open at each end, as shown in Figs. 1 and 3, serve for the free passage of air and greatly assist in keeping down the temperature of the liquid in the tank, and carry off any gases which may escape, which, in the transportation of petroleum, is a matter of importance.

When a house or box, *k*, is used to cover the freight, it is placed on the truck-tank alongside of the side pieces, *i i*, and, being firmly attached to the tank, helps to strengthen it.

The advantages of the mode hereinbefore described of constructing freight-cars are so obvious as scarcely to need stating. The immense amount of oil and other liquids now transported in barrels, with great loss by leakage and at a vast expenditure in the cost of barrels and of their freight when returning empty, renders my invention very useful and important. The peculiar construction of my cars is also a great advantage, as the tank, forming the car-truss, and being no heavier than the ordinary car-frame, causes no loss, even when empty, as the upper part of the car will carry as much freight as an ordinary freight-car. The placing of the tank partly below the level of the top of the wheels serves to steady the car when the tank is full by lowering its center of gravity, and relieves much of the strain of the wheels on the rails.

What I claim as my invention, and desire to secure by Letters Patent, is—

1. Constructing railway freight-cars (technically so called) with a covered tank or tanks for the transportation of liquids in bulk, when any part of such tank or tanks is placed below the level of the top of the wheels of the car.

2. Constructing railway-truck tanks for transporting liquids in bulk in such a manner, substantially as hereinbefore described, as that the metallic parts of the tank itself shall serve the purposes of a truck-frame.

3. Providing railway-truck tanks for transporting liquids in bulk with one or more contracted space or spaces in the upper part of the tank of less horizontal area than the body of the tank, for the purpose of affording room for the expansion of the liquid and checking its surging motion, substantially as hereinbefore described.

4. Constructing freight-cars with a tank or tanks for transporting liquids in bulk, combined with a box or receptacle for the carriage of dry freight, substantially as hereinbefore described.

5. The mode of ventilating combined railway-truck tanks and freight-cars by means of air-passages, substantially as and for the purposes hereinbefore set forth.

In testimony whereof the said JOEL F. KEELER hath hereunto set his hand in presence of witnesses.

JOEL F. KEELER.

Witnesses:
ALLAN C. BAKEWELL,
W. BAKEWELL.